(12) United States Patent
Nakada

(10) Patent No.: US 9,719,432 B2
(45) Date of Patent: Aug. 1, 2017

(54) CONTROL APPARATUS FOR INTERNAL COMBUSTION ENGINE

(75) Inventor: Hayato Nakada, Minamitsuru-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/344,024

(22) PCT Filed: Sep. 12, 2011

(86) PCT No.: PCT/JP2011/070745
§ 371 (c)(1),
(2), (4) Date: Mar. 10, 2014

(87) PCT Pub. No.: WO2013/038472
PCT Pub. Date: Mar. 21, 2013

(65) Prior Publication Data
US 2014/0236455 A1    Aug. 21, 2014

(51) Int. Cl.
*F02D 28/00* (2006.01)
*F02D 41/12* (2006.01)
(Continued)

(52) U.S. Cl.
CPC ........... *F02D 28/00* (2013.01); *F02D 41/123* (2013.01); *F02D 41/26* (2013.01); *G06F 9/5083* (2013.01);
(Continued)

(58) Field of Classification Search
CPC .. F02D 28/00; F02D 41/26; F02D 2041/1433; F02D 2200/0804; F02D 35/02;
(Continued)

(56) References Cited

U.S. PATENT DOCUMENTS 5,601,063 A * 2/1997 Ohashi et al. ................. 123/396
6,128,899 A * 10/2000 Oono .................... F01N 3/0842
123/325
(Continued)

FOREIGN PATENT DOCUMENTS

JP    2007-125950    5/2007
JP    2008-38604     2/2008
(Continued)

OTHER PUBLICATIONS

International Search Report issued Oct. 11, 2011 in corresponding PCT/JP2011/070745.

*Primary Examiner* — Stephen K Cronin
*Assistant Examiner* — Susan Scharpf
(74) *Attorney, Agent, or Firm* — Oblon, McClelland, Maier & Neustadt, L.L.P.

(57) ABSTRACT

A control apparatus for the internal combustion engine has a multicore processor mounted with a plurality of the cores, calculates various tasks regarding an operation of the internal combustion engine, and distributes the tasks to the plurality of the cores respectively to perform a calculation, and a controller that makes the number of cores for use in the calculation smaller while fuel cutoff is carried out than before the fuel cutoff is carried out. The controller selects, as a designated core, at least one of the cores for use in a specific calculation associated with combustion of the internal combustion engine. The controller stops the designated core from being used while fuel cutoff is carried out. As the specific calculation associated with combustion, for example, it is possible to mention a combustion forecasting calculation of a cylinder model, a temperature forecasting calculation of a catalyst temperature estimation model, and a fuel adhesion amount forecasting calculation of a fuel adhesion model.

5 Claims, 3 Drawing Sheets

(51) Int. Cl.
*F02D 41/26* (2006.01)
*G06F 9/50* (2006.01)
*F02D 41/04* (2006.01)
*F02D 41/14* (2006.01)
*F02D 35/02* (2006.01)

(52) U.S. Cl.
CPC ............ *F02D 35/02* (2013.01); *F02D 41/047* (2013.01); *F02D 41/1447* (2013.01); *F02D 2041/1433* (2013.01); *F02D 2200/0804* (2013.01)

(58) Field of Classification Search
CPC ... F02D 41/047; F02D 41/1447; G06F 9/5083
USPC ........ 701/102; 718/100, 101, 102, 103, 104, 718/105, 107
See application file for complete search history.

(56) References Cited

U.S. PATENT DOCUMENTS

| | | | |
|---|---|---|---|
| 6,260,058 B1* | 7/2001 | Hoenninger et al. | 718/107 |
| 6,705,286 B1* | 3/2004 | Light et al. | 123/396 |
| 6,968,552 B2* | 11/2005 | Nishimura | 718/107 |
| 6,993,763 B2* | 1/2006 | Hayes, Jr. | 718/102 |
| 7,086,056 B2* | 8/2006 | Fukushima | 718/102 |
| 7,308,886 B2* | 12/2007 | Balles | F02D 13/04 123/321 |
| 7,757,018 B2* | 7/2010 | Hillner et al. | 710/36 |
| 7,774,777 B2* | 8/2010 | Hurich | 718/100 |
| 7,861,042 B2* | 12/2010 | Larson | G06F 15/16 710/107 |
| 7,941,698 B1* | 5/2011 | Aggarwal et al. | 714/11 |
| 2009/0007117 A1* | 1/2009 | Cho | G06F 9/5027 718/100 |
| 2009/0205609 A1* | 8/2009 | Hartmann | F02D 13/0207 123/333 |
| 2010/0004841 A1 | 1/2010 | Mueller et al. | |
| 2010/0088441 A1* | 4/2010 | Peterson et al. | 710/110 |
| 2010/0138693 A1* | 6/2010 | Ohkawa | 714/25 |
| 2014/0040904 A1* | 2/2014 | Giusto et al. | 718/103 |

FOREIGN PATENT DOCUMENTS

| | | |
|---|---|---|
| JP | 2008-269487 | 11/2008 |
| JP | 2009-541636 | 11/2009 |
| JP | 2011-153596 | 8/2011 |

* cited by examiner

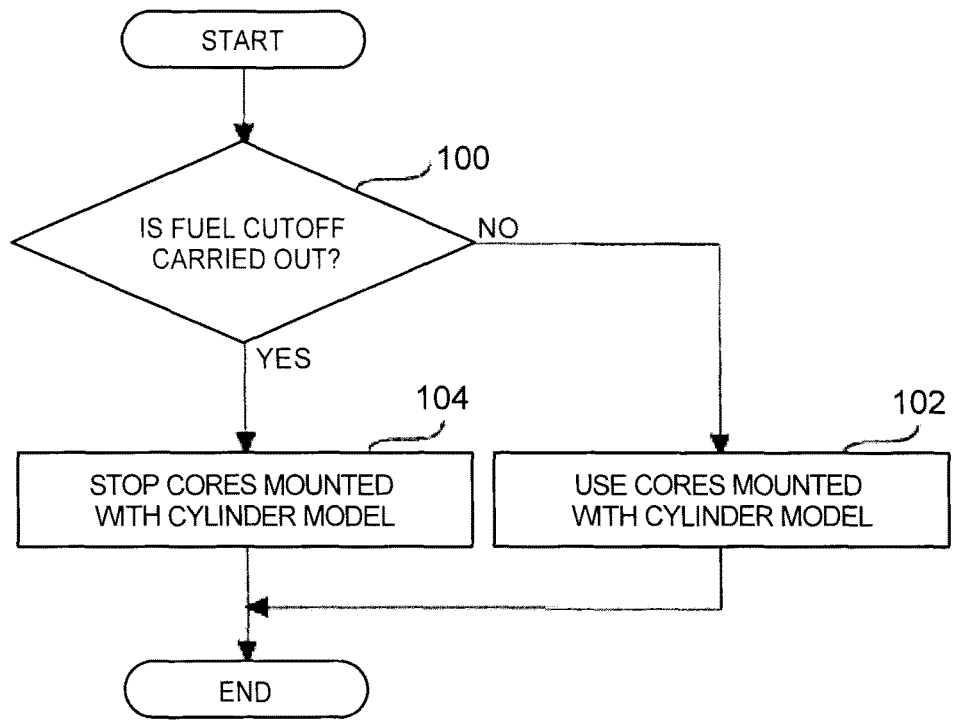
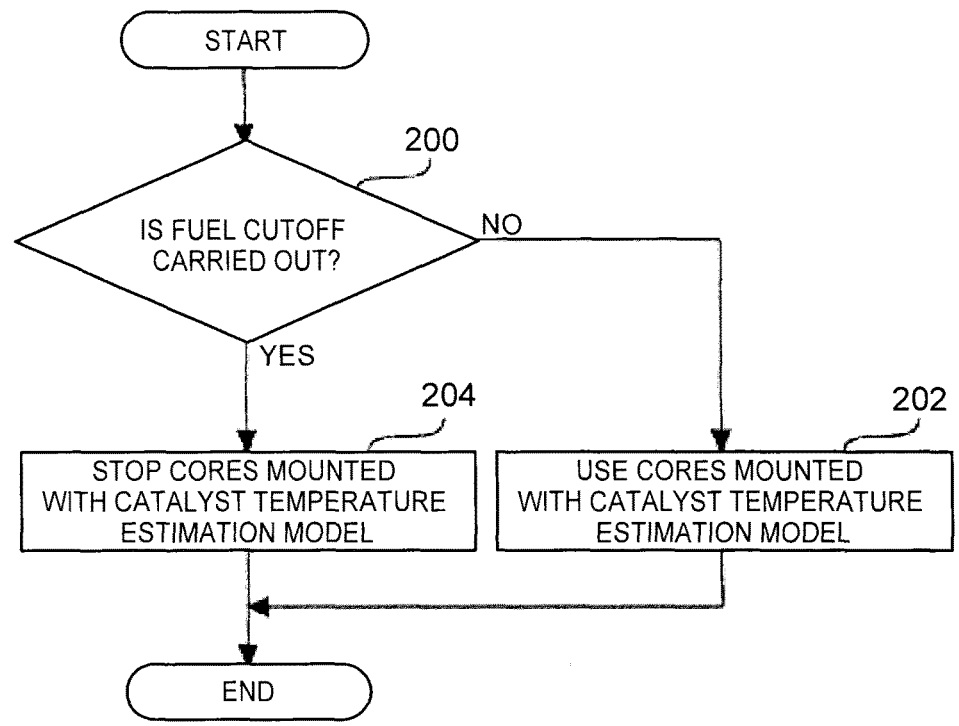

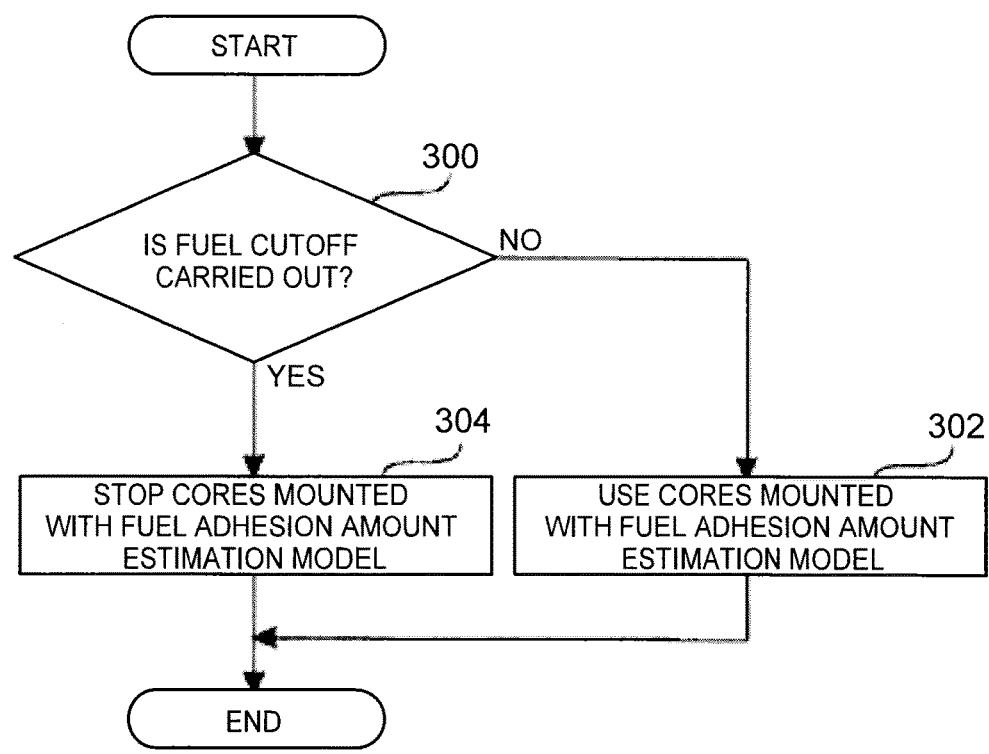

CONTROL APPARATUS FOR INTERNAL COMBUSTION ENGINE

TECHNICAL FIELD

This invention relates to a control apparatus for an internal combustion engine, and more particularly, to a control apparatus for an internal combustion engine that performs a calculation through the use of a multicore processor having a plurality of cores.

BACKGROUND ART

Conventionally, as disclosed in, for example, Japanese Patent Application Publication No. 2008-269487 (JP-2008-269487 A), in an engine control electronic control unit that is equipped with a microcomputer that adopts at least one of a multicore configuration and a cash memory mounting configuration, an art for reducing the power consumption during the stop of an engine is disclosed. Both CPU cores and a cash memory are elements with large power consumption in the microcomputer. Thus, in the aforementioned conventional art, a mode in which a maximum processing capacity is exerted by fully using the CPU cores and the cash memory is selected during the operation of the engine. A mode for setting the number of CPU cores and the used amount of the cash memory smaller than during the operation of the engine is selected during the stop of the engine.

RELATED ART DOCUMENTS

Patent Documents

Patent Document 1: Japanese Patent Application Publication No. 2008-269487 (JP-2008-269487 A)
Patent Document 2: Published Japanese Translation of PCT Application No. 2009-541636 (JP-2009-541636 A)

SUMMARY OF THE INVENTION

Problem to be Solved by the Invention

By the way, in model base control of an internal combustion engine with the aid of a control model of recent years, the speed of a calculation can be enhanced by performing a parallel calculation processing through the use of a multicore processor having a multitude of cores. However, if the number of cores for use increases, the calculation load increases, and the power consumption also tends to increase as a result. Thus, from the standpoint of reducing the power consumption, it is preferable to efficiently distribute a calculation resource in accordance with the calculation load. In this respect, in the aforementioned conventional device, the distribution of the calculation resource during the operation of the engine is not taken into account at all, and there still remains a room for improvement.

This invention has been made to solve the problem as described above. It is an object of the invention to provide a control apparatus for an internal combustion engine that allows cores for use to be distributed at a high rate in accordance with a calculation load of the internal combustion engine, in the internal combustion engine that performs a calculation processing through the use of a multicore processor having a plurality of the cores.

Means for Solving the Problem

In order to achieve the aforementioned object, the first invention is a control apparatus for an internal combustion engine that has a multicore processor mounted with a plurality of cores and calculates various tasks regarding operation of the internal combustion engine. The control apparatus is characterized by being equipped with calculation means for distributing the tasks to the plurality of the cores respectively to perform a calculation, and control means for making the number of cores for use in the calculation means smaller while fuel cutoff of the internal combustion engine is carried out than before the fuel cutoff is carried out.

In the first invention, the second invention is characterized in that the control means makes the number of cores for use in the calculation means larger after a recovery from the fuel cutoff is made than before the recovery is made.

In the first or second invention, the third invention is characterized in that the calculation means includes selection means for selecting, as a designated core, at least one of the cores for use in a specific calculation associated with combustion of the internal combustion engine, and that the control means stops the designated core from being used while fuel cutoff of the internal combustion engine is carried out.

In the third invention, the fourth invention is characterized in that the calculation means includes model calculation means for performing a combustion forecasting calculation with the aid of a cylinder model of the internal combustion engine, and that the selection means selects, as the designated core, at least one of the cores for use in the combustion forecasting calculation in the model calculation means.

In the third or fourth invention, the fifth invention is characterized in that the internal combustion engine is a diesel engine that is equipped with a post-treatment device in an exhaust system, that the calculation means includes second model calculation means for performing a temperature forecasting calculation of the post-treatment device with the aid of a catalyst temperature estimation model, and that the selection means selects, as the designated core, at least one of the cores for use in a temperature forecasting calculation in the second model calculation means.

In the third or fourth invention, the sixth invention is characterized in that the internal combustion engine is a spark ignition engine that is equipped with a port injector that injects fuel into an intake port, that the calculation means includes third model calculation means for performing a fuel adhesion amount forecasting calculation of the intake port with the aid of a fuel adhesion model, and that the selection means selects, as the designated core, at least one of the cores for use in the fuel adhesion amount forecasting calculation in the third model calculation means.

Effects of the Invention

According to the first invention, the number of cores for use is made smaller while fuel cutoff of the internal combustion engine is carried out than before the fuel cutoff is carried out. While fuel cutoff is carried out, combustion is not carried out in the engine, and hence the order of a model equation to be solved is smaller than before the fuel cutoff is carried out. Thus, according to the invention, the number of cores for use can be reduced as the calculation load decreases. Therefore, the cores for use can be distributed at a high rate in accordance with the calculation load of the internal combustion engine.

According to the second invention, the number of cores for use is made larger after the recovery from fuel cutoff is made than before the recovery is made. Thus, according to the invention, the number of cores for use can be increased as the order of the model to be solved increases. Therefore, the cores for use can be distributed at a high rate in accordance with the calculation load of the internal combustion engine.

According to the third invention, at least one of the cores for use in the specific calculation associated with engine combustion is selected as the designated core. In addition, while fuel cutoff is carried out, the designated core is stopped from being used. Thus, according to the invention, an unnecessary calculation can be effectively stopped while the fuel cutoff is carried out, and the cores for use can be distributed at a high rate in accordance with the calculation load of the internal combustion engine.

According to the fourth invention, the core for use in the combustion forecasting calculation with the aid of the cylinder model is selected as the designated core, and the designated core is stopped from being used while fuel cutoff is carried out. Thus, according to the invention, the combustion forecasting calculation of the cylinder model that does not need to be calculated can be efficiently stopped while the fuel cutoff is carried out, and a calculation resource can be effectively distributed in the apparatus as a whole.

According to the fifth invention, the core for use in the temperature forecasting calculation with the aid of the temperature estimation model of an exhaust gas purification catalyst is selected as the designated core, and the designated core is stopped from being used while fuel cutoff is carried out. Thus, according to the invention, the temperature forecasting calculation of the temperature estimation model that does not need to be calculated can be efficiently stopped while the fuel cutoff is carried out, and a calculation resource can be effectively distributed in the apparatus as a whole.

According to the sixth invention, the core for use in the fuel adhesion amount forecasting calculation with the aid of the fuel adhesion model of the intake port is selected as the designated core, and the designated core is stopped from being used while fuel cutoff is carried out. Thus, according to the invention, the fuel adhesion amount forecasting calculation of the fuel adhesion model that does not need to be calculated can be efficiently stopped while the fuel cutoff is carried out, and a calculation resource can be effectively distributed in the apparatus as a whole.

BRIEF DESCRIPTION OF THE DRAWINGS

FIG. 2 is a flowchart of a routine that is executed in the first embodiment of the invention.

FIG. 3 is a flowchart of a routine that is executed in the second embodiment of the invention.

FIG. 4 is a flowchart of a routine that is executed in the third embodiment of the invention.

MODES FOR CARRYING OUT THE INVENTION

Figure 1:
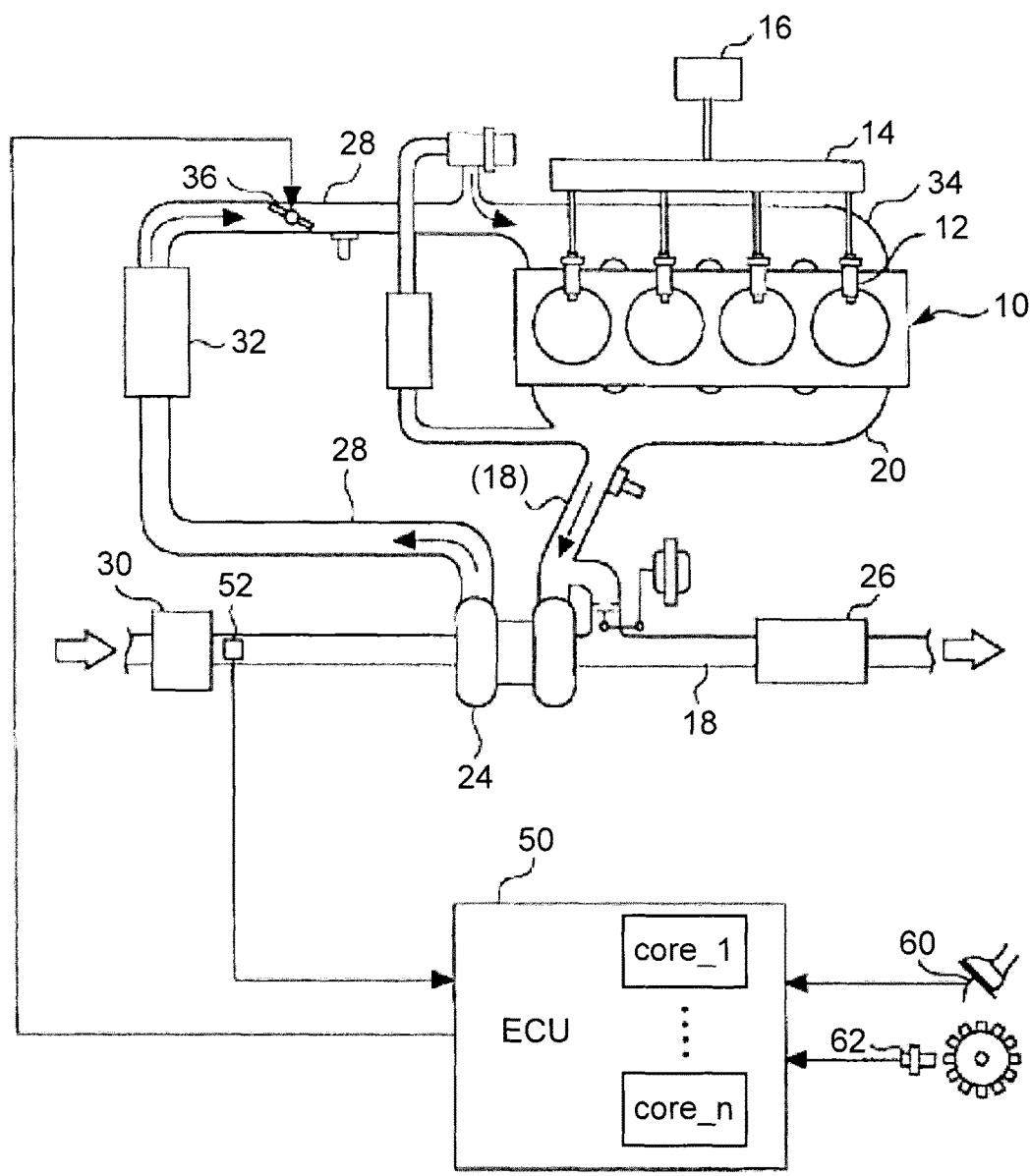
FIG. 1 is a view for explaining an overall configuration of an internal combustion engine system as embodiments of the invention.

The embodiments of this invention will be described hereinafter on the basis of the drawings. Incidentally, elements common to the respective drawings are denoted by the same reference symbols respectively, and redundant description will be omitted. Besides, this invention should not be limited by the following embodiments thereof.

First Embodiment

[Configuration of First Embodiment]

FIG. 1 is a view for explaining an overall configuration of an internal combustion engine system as the embodiments of the invention. As shown in FIG. 1, the system of this embodiment of the invention is equipped with a four-cycle internal combustion engine (a diesel engine) that has a plurality of cylinders (four cylinders in FIG. 1). It is assumed that the internal combustion engine 10 is mounted on a vehicle and used as a power source thereof.

Injectors 12 for directly injecting fuel into the cylinders of the internal combustion engine 10 are installed in the cylinders respectively. The injectors 12 of the respective cylinders are connected to a common rail 14 that is common thereto. Fuel in a fuel tank (not shown) is pressurized to a predetermined fuel pressure by a supply pump 16, accumulated in the common rail 14, and supplied from the common rail 14 to the respective injectors 12.

An exhaust passage 18 of the internal combustion engine 10 branches off from an exhaust manifold 20, and is connected to exhaust ports (not shown) of the respective cylinders. The exhaust passage 18 is connected to an exhaust turbine of a turbo supercharger 24. A post-treatment device 26 for purifying exhaust gas is provided downstream of the turbo supercharger 24 in the exhaust passage 18. For example, an oxidation catalyst, an NOx catalyst, a diesel particulate filter (a DPF), a diesel particulate-NOx-reduction system (a DPNR) or the like can be employed as the post-treatment device 26.

An air cleaner 30 is provided in the vicinity of an inlet of an intake passage 28 of the internal combustion engine 10. Air sucked in through the air cleaner 30 is compressed by an intake air compressor of the turbo supercharger 24, and then cooled by an intercooler 32. Intake air that has passed through the intercooler 32 is distributed to intake ports (not shown) of the respective cylinders by an intake manifold 34.

An intake throttle valve 36 is installed between the intercooler 32 and the intake manifold 34 in the intake passage 28. Besides, an air flow meter 52 for detecting an intake air amount is installed in the vicinity of a region downstream of the air cleaner 30 in the intake passage 28.

As shown in FIG. 1, the system of this embodiment of the invention is equipped with an electronic control unit (an ECU) 50. The ECU 50 is configured as a multicore ECU having a processor that is mounted with n cores (the core_1 to the core_n), and the use or stop can be variably set for each of the cores on each occasion. In addition to the aforementioned air flow meter 52, various sensors for controlling the internal combustion engine 10, such as an accelerator position sensor 60 for detecting a depression amount of an accelerator pedal (an accelerator opening degree), a crank angle sensor 62 for detecting a crank angle of the internal combustion engine 10, and the like are connected to an input portion of the ECU 50. Besides, in addition to the aforementioned injectors 12 and the aforementioned intake throttle valve 36, various actuators for controlling the internal combustion engine 10 are connected to an output portion of the ECU 50. The ECU 50 executes a predetermined control algorithm for driving the various actuators on the basis of various pieces of input information.

[Operation of First Embodiment]

Next, the operation of the first embodiment of the invention will be described. The internal combustion engine 10 according to this embodiment of the invention is equipped with various actuators for controlling the internal combustion engine 10, for example, an EGR valve, a WGV and the like in addition to the injectors 12 and the intake throttle valve 36, as actuators for controlling the operation of the internal combustion engine 10. The control apparatus according to this embodiment of the invention controls the internal combustion engine through so-called model base control, estimates a control state through the frequent use of model forecasting, and determines controlled variables of the aforementioned various actuators.

Examples of model base control that is performed in the system of this embodiment of the invention include a combustion forecasting calculation with the aid of a cylinder model. Specifically, the cylinder model is a model that uses a flow rate of air flowing into each of the cylinders, an amount of fuel, and an ignition timing as inputs, and forecasts outputs resulting from the combustion in the cylinders (e.g., a torque, a temperature of gas discharged from the cylinders, and the like). Incidentally, since there are many known documents as to a model configuration of the cylinder model, detailed description thereof will be omitted.

In the system of this embodiment of the invention, which is equipped with the multicore ECU, the aforementioned model base control is performed in one or a plurality of designated cores selected from the plurality of the cores. Incidentally, the designated cores are cores selected as cores for exclusively performing the combustion forecasting calculation, and it is preferable that the number of designated cores be set such that a calculation resource can be effectively utilized, in consideration of a status of use of the cores of the system. Besides, in the case where a parallel calculation processing is performed through the use of the plurality of the designated cores, a combustion forecasting calculation algorithm of the cylinder model is divided through the use of a known parallelization compiler, for example, an optimally scheduled advanced multiprocessor (an OSCAR) or the like, and tasks are allocated to the designated cores respectively. In this manner, if the parallel calculation processing is performed, the calculation load is effectively reduced in comparison with a case where a sequential calculation processing is performed in a single core.

It should be noted herein that the aforementioned model base control does not always need a calculation during the operation of the internal combustion engine 10, and that there is a period in which no problem is caused if the calculation is stopped in a certain operation state of the internal combustion engine 10. That is, as described above, in the combustion forecasting calculation of the cylinder model, a combustion state in each of the cylinders is forecast. Thus, while fuel cutoff of the internal combustion engine 10 is carried out, no problem is caused if the forecasting calculation is stopped. By contrast, the stop of the forecasting calculation is preferable from the standpoint of reducing the calculation load.

Thus, in the system of this embodiment of the invention, while fuel cutoff is carried out so that there is no need to perform the aforementioned combustion forecasting calculation of the aforementioned cylinder model, the cores in which the calculation is performed are stopped. Thus, the cores in which the unnecessary calculation is performed can be stopped while fuel cutoff is carried out. Therefore, by effectively distributing the remaining calculation resource, the calculation load can be reduced in the system as a whole. Thus, the control of the internal combustion engine can be realized with high accuracy while avoiding task omission.

Besides, in the system of this embodiment of the invention, as soon as a recovery from fuel cutoff of the internal combustion engine 10 is made, the forecasting calculation in the aforementioned stopped cores is resumed. Thus, an increase in the calculation load resulting from the start of the combustion forecasting calculation can be compensated for by increasing the number of cores for use. Therefore, the cores for use can be distributed at a high rate in accordance with the calculation load of the internal combustion engine 10.

[Concrete Processing in First Embodiment]

Next, the concrete contents of the processing performed in this embodiment of the invention will be described with reference to FIG. 2. FIG. 2 is a flowchart of a routine in which the ECU 50 increases/reduces the number of cores for use in a calculation. Incidentally, it is assumed that the routine shown in FIG. 2 is repeatedly executed during the operation of the internal combustion engine 10. Besides, as a prerequisite for executing the routine shown in FIG. 2, it is assumed herein that the plurality of the designated cores in which the combustion forecasting calculation of the cylinder model is performed has already been selected, and that the tasks of the combustion forecasting calculation are allocated to these designated cores respectively.

In the routine shown in FIG. 2, first of all, it is determined whether or not fuel cutoff is carried out in the internal combustion engine 10 (step 100). As a result, if fuel cutoff is not carried out in the internal combustion engine 10, a transition to a subsequent step is made to perform a combustion forecasting calculation in the cores mounted with the cylinder model (step 102). On the other hand, if it is determined in the aforementioned step 100 that fuel cutoff is carried out, it is determined that there is no need to perform the combustion forecasting calculation with the aid of the cylinder model, and a transition to a subsequent step is made to stop the cores mounted with the cylinder model (step 104).

As described above, according to the system of this embodiment of the invention, while fuel cutoff of the internal combustion engine 10 is carried out, the cores in which the calculation of the cylinder model is performed are stopped. Thus, the calculation load needed for model forecasting can be adjusted in accordance with the operation state of the internal combustion engine 10. Therefore, a calculation resource can be effectively distributed in the system as a whole.

By the way, in the aforementioned first embodiment of the invention, the case where the invention is applied to the control of the diesel engine (a compression ignition internal combustion engine) has been described. However, the invention is not limited to diesel engines, but is also applicable to the control of spark ignition internal combustion engines using gasoline or alcohol as a fuel, and various other internal combustion engines.

Besides, in the aforementioned first embodiment of the invention, the designated cores in which the combustion forecasting calculation of the cylinder model is performed are stopped while fuel cutoff is carried out. However, the cores that can be stopped are not limited to the designated cores. That is, while fuel cutoff is carried out, the calculation load regarding the combustion forecasting calculation of the cylinder model decreases to no small extent. Thus, by stopping any of the cores and allocating the tasks of the stopped cores to the remaining cores for use while fuel cutoff is carried out, the cores for use can be distributed at a high rate in accordance with the calculation load of the internal combustion engine while reducing the number of cores for use.

Incidentally, in the aforementioned first embodiment of the invention, the ECU 50 performs the process of the aforementioned step 104, thereby realizing "the control means" in the first or third invention. The ECU 50 performs the process of the aforementioned step 102, thereby realizing "the control means" in the second invention.

Second Embodiment

[Feature of Second Embodiment]

Next, the second embodiment of the invention will be described with reference to FIG. 3. This second embodiment of the invention can be realized by executing a routine shown in FIG. 3, which will be described later, through the use of the system shown in FIG. 1.

In the system of the aforementioned first embodiment of the invention, combustion forecasting control with the aid of the cylinder model has been described as model base control that can be stopped while fuel cutoff of the internal combustion engine 10 is carried out. In the system of this embodiment of the invention, a temperature forecasting calculation with the aid of a catalyst temperature estimation model will be described as another example of model base control that can be stopped while fuel cutoff of the internal combustion engine 10 is carried out. Specifically, the catalyst temperature estimation model is a model that forecasts a temperature of gas discharged from the post-treatment device 26, using properties (components, a temperature, and a flow rate) of gas flowing into the post-treatment device 26 of the internal combustion engine 10 as inputs. Incidentally, since there are already many known documents as to the model configuration of the catalyst temperature estimation model, detailed description thereof will be omitted.

Temperature forecasting control of the catalyst temperature estimation model according to this embodiment of the invention is performed in one or a plurality of designated cores selected from the plurality of the cores, as is the case with combustion forecasting control with the aid of the cylinder model in the aforementioned first embodiment of the invention.

It should be noted herein that while fuel cutoff of the internal combustion engine 10 is carried out, the amount of heat supplied from exhaust gas is zero, and hence there is no need to solve a differential equation of the catalyst temperature in a temperature forecasting calculation. Thus, in the system of this embodiment of the invention, the cores in which the calculation is performed are stopped while fuel cutoff is carried out so that there is no need to perform the temperature forecasting calculation of the aforementioned catalyst temperature estimation model. Thus, the temperature forecasting calculation with a high calculation load can be stopped. Therefore, the calculation load can be reduced in the system as a whole, by effectively distributing the remaining calculation resource.

Besides, in the system of this embodiment of the invention, as soon as a recovery from fuel cutoff of the internal combustion engine 10 is made, the forecasting calculation in the aforementioned stopped cores is resumed. Thus, an increase in the calculation load resulting from the start of the combustion forecasting calculation can be compensated for by increasing the number of cores for use. Therefore, the cores for use can be distributed at a high rate in accordance with the calculation load of the internal combustion engine 10.

[Concrete Processing in Second Embodiment]

Next, the concrete contents of a processing that is performed in this embodiment of the invention will be described with reference to FIG. 3. FIG. 3 is a flowchart of a routine in which the ECU 50 increases/reduces the number of cores for use in a calculation. Incidentally, it is assumed that the routine shown in FIG. 3 is repeatedly executed during the operation of the internal combustion engine 10. Besides, as a prerequisite for executing the routine shown in FIG. 3, it is assumed herein that a plurality of designated cores in which the temperature forecasting calculation of the catalyst temperature estimation model is performed have already been selected, and that tasks of the temperature forecasting calculation are allocated to these designated cores respectively.

In the routine shown in FIG. 3, first of all, it is determined whether or not fuel cutoff is carried out in the internal combustion engine 10 (step 200). In this case, a process similar to that of the aforementioned step 100 is performed. As a result, if fuel cutoff is not carried out in the internal combustion engine 10, a transition to a subsequent step is made to perform the temperature forecasting calculation in the cores mounted with the catalyst temperature estimation model (step 202). On the other hand, if it is determined in the aforementioned step 200 that fuel cutoff is carried out, it is determined that there is no need to perform the temperature forecasting calculation with the aid of the catalyst temperature estimation model, and a transition to a subsequent step is made to stop the cores mounted with the catalyst temperature estimation model (step 204).

As described above, according to the system of this embodiment of the invention, while fuel cutoff of the internal combustion engine 10 is carried out, the cores in which the calculation of the catalyst temperature estimation model is performed are stopped. Thus, the calculation load needed for model forecasting can be adjusted in accordance with the operation state of the internal combustion engine 10. Therefore, a calculation resource can be effectively distributed in the system as a whole.

By the way, in the aforementioned second embodiment of the invention, the designated cores in which the temperature forecasting calculation of the catalyst temperature estimation model is performed are stopped while fuel cutoff is carried out. However, the cores that can be stopped are not limited to the designated cores. That is, while fuel cutoff is carried out, the calculation load regarding the temperature forecasting calculation of the catalyst temperature estimation model decreases to no small extent. Thus, by stopping any of the cores and allocating the tasks of the stopped cores to the remaining cores for use while fuel cutoff is carried out, the cores for use can be distributed at a high rate in accordance with the calculation load of the internal combustion engine while reducing the number of cores for use.

Besides, in the aforementioned second embodiment of the invention, the designated cores in which the temperature forecasting calculation of the catalyst temperature estimation model are stopped while fuel cutoff is carried out. However, the core stop control of the combustion forecasting calculation with the aid of the aforementioned cylinder model in the first embodiment of the invention may also be performed simultaneously.

Incidentally, in the aforementioned second embodiment of the invention, the ECU 50 performs the process of the aforementioned step 104, thereby realizing "the control means" in the first or third invention. The ECU 50 performs the process of the aforementioned step 102, thereby realizing "the control means" in the second invention.

Third Embodiment

[Feature of Third Embodiment]

Next, the third embodiment of the invention will be described with reference to FIG. 4. This third embodiment of the invention can be realized by executing a routine shown in FIG. 4, which will be described later, through the use of a system that is obtained by replacing the internal combustion engine 10 shown in FIG. 1 with a port injection gasoline engine.

In the system of the aforementioned first embodiment of the invention, the combustion forecasting control with the aid of the cylinder model has been described as model base control that can be stopped while fuel cutoff of the internal combustion engine 10 is carried out. In the system of this embodiment of the invention, a fuel adhesion amount forecasting calculation of ports with the aid of a fuel adhesion model will be described as another example of model base control that can be stopped while fuel cutoff of the internal combustion engine 10 is carried out. Specifically, the fuel adhesion model is a model that shows the behavior of fuel injected into the ports of the internal combustion engine 10, and is a model that forecasts an amount of fuel that has adhered to the ports on the basis of an amount of fuel injection to the ports, a port adhesion ratio, and a port residual ratio. Incidentally, since there are already many known documents as to the model configuration of the fuel adhesion model, detailed description thereof will be omitted.

Fuel adhesion amount forecasting control of the fuel adhesion model according to this embodiment of the invention is performed in one or a plurality of designated cores selected from the plurality of the cores, as is the case with combustion forecasting control with the aid of the cylinder model in the aforementioned first embodiment of the invention.

It should be noted herein that if fuel cutoff of the internal combustion engine 10 is started, no fuel adheres and hence the amount of fuel that has adhered to the ports immediately decreases to become equal to zero. If the amount of fuel that has adhered to the ports becomes completely equal to zero, there is no need to calculate the fuel adhesion model any more. Thus, in the system of this embodiment of the invention, the cores in which the fuel adhesion amount forecasting calculation is performed are stopped while fuel cutoff is carried out. Thus, the number of cores for use can be effectively reduced. Therefore, the remaining calculation resource can be effectively distributed in the system as a whole, and the calculation load can be reduced.

Besides, in the system of this embodiment of the invention, as soon as a recovery from fuel cutoff of the internal combustion engine 10 is made, the forecasting calculation in the aforementioned stopped cores is resumed. Thus, an increase in the calculation load resulting from the start of the combustion forecasting calculation can be compensated for by increasing the number of cores for use. Therefore, the cores for use can be distributed at a high rate in accordance with the calculation load of the internal combustion engine 10.

[Concrete Processing in Third Embodiment]

Next, the concrete contents of a processing performed in this embodiment of the invention will be described with reference to FIG. 4. FIG. 4 is a flowchart of a routine in which the ECU 50 increases/reduces the number of cores for use in a calculation. Incidentally, it is assumed that the routine shown in FIG. 4 is repeatedly executed during the operation of the internal combustion engine 10. Besides, as a prerequisite for executing the routine shown in FIG. 4, it is assumed herein that a plurality of designated cores in which the fuel adhesion amount forecasting calculation of the fuel adhesion model is performed have already been selected, and that tasks of the fuel adhesion amount forecasting calculation are allocated to these designated cores respectively.

In the routine shown in FIG. 4, first of all, it is determined whether or not fuel cutoff is carried out in the internal combustion engine 10 (step 300). In this case, a process similar to that of the aforementioned step 100 is performed. As a result, if fuel cutoff is not carried out in the internal combustion engine 10, a transition to a subsequent step is made to perform the fuel adhesion amount forecasting calculation in the cores mounted with the fuel adhesion model (step 302). On the other hand, if it is determined in the aforementioned step 300 that fuel cutoff is carried out, it is determined that there is no need to perform the fuel adhesion amount forecasting calculation with the aid of the fuel adhesion model, and a transition to a subsequent step is made to stop the cores mounted with the fuel adhesion model (step 304).

As described above, according to the system of this embodiment of the invention, while fuel cutoff of the internal combustion engine 10 is carried out, the cores in which the fuel adhesion model is calculated are stopped. Thus, the calculation load needed for model forecasting can be adjusted in accordance with the operation state of the internal combustion engine 10. Therefore, a calculation resource can be effectively distributed in the system as a whole.

By the way, in the aforementioned third embodiment of the invention, the designated cores in which the fuel adhesion amount forecasting calculation of the fuel adhesion model is performed are stopped while fuel cutoff is carried out. However, the cores that can be stopped are not limited to the designated cores. That is, while fuel cutoff is carried out, the calculation load regarding the fuel adhesion amount forecasting calculation of the fuel adhesion model decreases to no small extent. Thus, by stopping any of the cores and allocating the tasks of the stopped cores to the remaining cores for use while fuel cutoff is carried out, the cores for use can be distributed at a high rate in accordance with the calculation load of the internal combustion engine while reducing the number of cores for use.

Besides, in the aforementioned third embodiment of the invention, the designated cores in which the fuel adhesion amount forecasting calculation of the fuel adhesion model is performed are stopped while fuel cutoff is carried out. However, the core stop control of the combustion forecasting calculation with the aid of the aforementioned cylinder model in the first embodiment of the invention may also be performed simultaneously.

Besides, in the aforementioned third embodiment of the invention, the designated cores in which the fuel adhesion amount forecasting calculation of the fuel adhesion model is performed are stopped while fuel cutoff is carried out. However, the timing when the designated cores are stopped is not limited to the timing when fuel cutoff is started. The designated cores may be stopped as soon as the amount of fuel that has adhered to the port becomes completely equal to zero.

Incidentally, in the aforementioned third embodiment of the invention, the ECU 50 performs the process of the aforementioned step 104, thereby realizing "the control means" in the first or third invention. The ECU 50 performs the process of the aforementioned step 102, thereby realizing "the control means" in the second invention.

DESCRIPTION OF REFERENCE NUMERALS

10 INTERNAL COMBUSTION ENGINE (ENGINE)
12 INJECTOR
18 EXHAUST PASSAGE
26 POST-TREATMENT DEVICE
28 INTAKE PASSAGE
36 INTAKE THROTTLE VALVE
50 ELECTRONIC CONTROL UNIT (ECU)

The invention claimed is:

1. A control apparatus for an internal combustion engine that has a multicore processor mounted with a plurality of cores and performs a combustion forecasting calculation based on a cylinder model of the internal combustion engine, comprising:
a controller configured to:
distribute the tasks to the plurality of the cores respectively to perform the combustion forecasting calculation,
select, as a designated core, at least one of the cores of the plurality of cores for use in the combustion forecasting calculation, the designated core being associated with calculation of a fuel injection amount of the internal combustion engine,
decrease a number of cores for use in the combustion forecasting calculation while all cylinder fuel cutoff of the internal combustion engine is carried out than before the all cylinder fuel cutoff is carried out, and
stop the designated core from being used while all cylinder fuel cutoff of the internal combustion engine is carried out,
wherein the cylinder model of the internal combustion engine used for the combustion forecasting calculation uses a flow rate of air flowing into each of the cylinders, an amount of fuel, and an ignition timing as inputs, and forecasts outputs resulting from the combustion in the cylinders including torque and a temperature of gas discharged from the cylinders.

2. The control apparatus for the internal combustion engine according to claim 1, wherein the controller is configured to increase the number of cores for use in the calculation after a recovery from the all cylinder fuel cutoff is made than before the recovery is made.

3. The control apparatus for the internal combustion engine according to claim 1, wherein the controller is configured to use the designated core while all cylinder fuel cutoff of the internal combustion engine is not carried out.

4. A control apparatus for a diesel engine that is equipped with a post-treatment device in an exhaust system, the diesel engine has a multicore processor mounted with a plurality of cores and performs a temperature forecasting calculation of the post-treatment device based on a catalyst temperature estimation model, comprising:
a controller configured to:
distribute the tasks to the plurality of the cores respectively to perform the temperature forecasting calculation,
select, as a designated core, at least one of the cores of the plurality of cores for use in the temperature forecasting calculation, the designated core being associated with calculation of a fuel injection amount of the diesel engine,
decrease a number of cores for use in the temperature forecasting calculation while all cylinder fuel cutoff of the diesel engine is carried out than before the all cylinder fuel cutoff is carried out, and
stop the designated core from being used while all cylinder fuel cutoff of the diesel engine is carried out,
wherein the catalyst temperature estimation model of the diesel engine used for the temperature forecasting calculation uses properties of gas flowing into the post-treatment device including components, temperature, and flow rate as inputs, and forecasts a temperature of gas discharged from the post-treatment device.

5. A control apparatus for a spark ignition engine that is equipped with a port injector that injects fuel into an intake port, the spark ignition engine has a multicore processor mounted with a plurality of cores and performs a fuel adhesion amount forecasting calculation of the intake port based on a fuel adhesion model, comprising:
a controller configured to:
distribute the tasks to the plurality of the cores respectively to perform the fuel adhesion amount forecasting calculation,
select, as a designated core, at least one of the cores of the plurality of cores for use in the fuel adhesion amount forecasting calculation, the designated core being associated with calculation of a fuel injection amount of the spark ignition engine,
decrease a number of cores for use in the fuel adhesion amount forecasting calculation while all cylinder fuel cutoff of the spark ignition engine is carried out than before the all cylinder fuel cutoff is carried out, and
stop the designated core from being used while all cylinder fuel cutoff of the spark ignition engine is carried out,
wherein the fuel adhesion model of the spark ignition engine used in the fuel adhesion amount forecasting calculation uses an amount of fuel injection to the intake port, a port adhesion ratio, and a port residual ratio as inputs, and forecasts an amount of fuel adhered to the intake port.

* * * * *